D. F. BALENTINE.
HARNESS.
APPLICATION FILED FEB. 28, 1908.
932,238.
Patented Aug. 24, 1909.
2 SHEETS—SHEET 1.
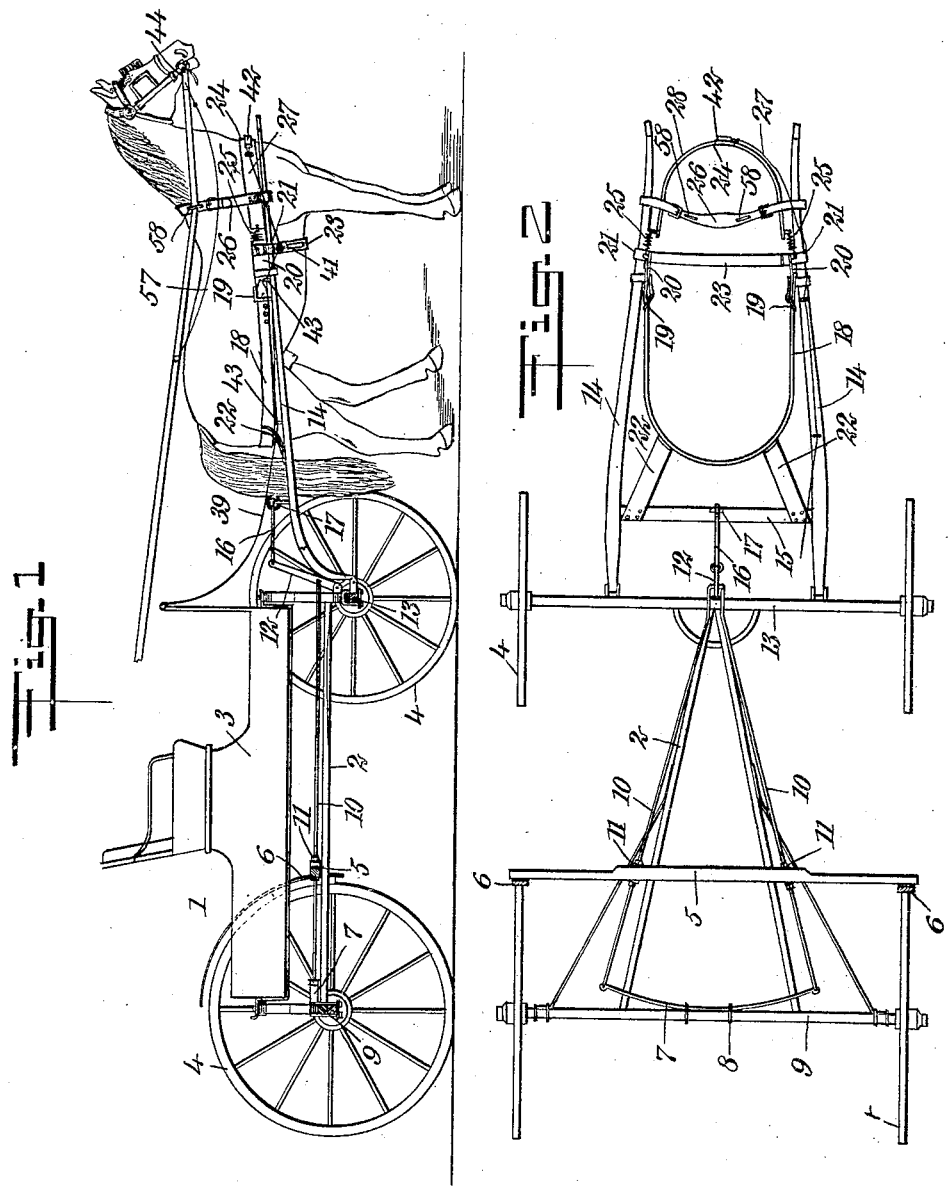
WITNESSES
INVENTOR
David F. Balentine
BY
ATTORNEYS D. F. BALENTINE.
HARNESS.
APPLICATION FILED FEB. 28, 1908.
932,238.
Patented Aug. 24, 1909.
2 SHEETS—SHEET 2.
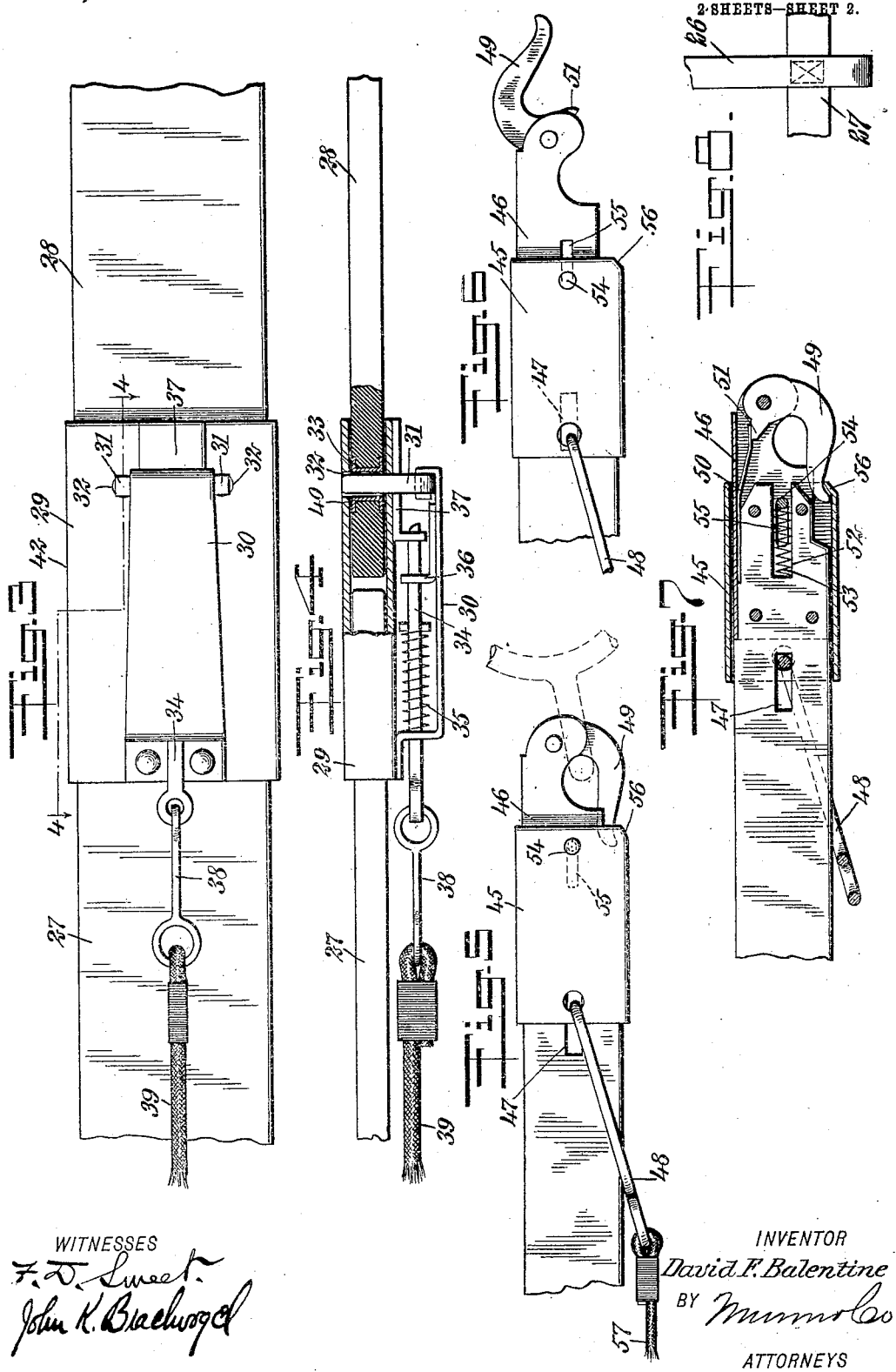
WITNESSES
F. D. Sweet
John K. Blackwood
INVENTOR
David F. Balentine
BY Munn & Co
ATTORNEYS

UNITED STATES PATENT OFFICE.

DAVID F. BALENTINE, OF GREENVILLE, SOUTH CAROLINA.

HARNESS.

932,238.   Specification of Letters Patent.   Patented Aug. 24, 1909.

Application filed February 28, 1908. Serial No. 418,234.

*To all whom it may concern:*

Be it known that I, DAVID F. BALENTINE, a citizen of the United States, and a resident of Greenville, in the county of Greenville and State of South Carolina, have invented a new and Improved Harness, of which the following is a full, clear, and exact description.

This invention relates to harness for detachably securing a draft animal to a vehicle so that the driver can instantly release the animal in an emergency.

An object of the invention is to provide a simple harness of the class described, by means of which a horse or other draft animal can be firmly secured to the vehicle, and which permits the horse to be instantly released from the vehicle in case of necessity, without requiring that the driver leave his position in the vehicle.

A further object of the invention is to provide a harness for securing a horse to a vehicle so that the horse can be instantly released from the vehicle by the occupant of the same, and which includes means for setting the vehicle brake as soon as the animal has been disconnected from the vehicle.

A still further object of the invention is to provide means for harnessing a horse to a vehicle, which permits the animal to be instantly released from the vehicle by the occupant of the same, and in which the driving reins are disengaged from the bridle after the horse is released from the vehicle.
The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of a horse-drawn vehicle having my invention applied thereto; Fig. 2 is a plan view of the running gear of the vehicle together with the means for attaching the horse or other animal to the same; Fig. 3 is an enlarged elevation showing a portion of the breast-strap of the harness, together with a catch which permits the release of the breast-strap; Fig. 4 is a longitudinal section on the line 4—4 of Fig. 3; Fig. 5 is an elevation of a portion of a driving rein showing the removable means for attaching the rein to the bridle; Fig. 6 is a similar view showing certain of the parts in different positions; Fig. 7 is a longitudinal section showing the means for attaching the rein to the bit ring; and Fig. 8 is a side elevation showing a detail.

Before proceeding to a more detailed explanation of my invention, it should be understood that the same is particularly useful in connection with horse-drawn vehicles such as carriages and the like, though it can be advantageously applied to vehicles drawn by other draft animals, and to vehicles of different types.

It is a matter of common knowledge that a great many accidents result from the running away of horses attached to vehicles, when it is impossible to bring the animals to a stop or to release them from the vehicle. My invention provides means for effectually attaching a horse to a vehicle, but which, in case of necessity, can be instantly released to free the animal from the vehicle. By thus releasing the horse in case it is running away, the occupant of the vehicle and the vehicle itself can often be saved from danger. I provide means, furthermore, for setting the brake of the vehicle as soon as the animal is released, so that the vehicle is at once brought to a stop.

Referring more particularly to the drawings, 1 represents a vehicle, for example a runabout or buggy. The vehicle has the usual running gear 2 carrying the body 3, and supported by the wheels 4. The brake-beam 5 is mounted underneath the body and has brake shoes 6 adapted to be forced against the rear wheels to bring the vehicle to a stop. The brake shoes may be of any preferred or common form, or as shown in the drawings, may be enlarged to constitute mud guards. A spring bar 7 is secured by means of shackles 8 upon the rear axle 9 of the running gear, and has the opposite ends secured to brake rods 10. The latter are connected by means of brackets 11 with the brake beam 5 and have the forward ends secured to brake rods 10. The latter are axle 13. The shafts 14 are secured in the usual manner to the front axle 13 and are connected near the latter by a rigid cross-bar 15. A link 16 joins the free end of the lever 12 and a staple 17 carried by the cross-bar 15. The shafts 14 when elevated permit the brake shoes through the intermediate connecting means, to engage the rear wheels and thus set the brake. The spring-bar 7 serves normally to maintain the brake set, and to hold the shafts in a position elevated above the normal position of the shafts when they are attached to a horse.

I provide a U-shaped band 18 of leather or other suitable material and arranged between the shafts. The ends of the band 18 are connected by means of strap buckles 19, with extensions 20 rigidly secured by means of loops 21 or in any other suitable manner to the shafts 14. The sides of the band 18 take the place of the traces, and the curved portion of the band forms the breeching of the harness. The band is connected by means of tugs 22 with the cross-bar 15. A belly-band 23 is fastened to the shafts 14 near the forward ends of the extension straps 20. A breast-strap 24 is arranged between the ends of the shafts and has the extremities secured by means of springs 25 or by other resilient means, to the extension straps 20. A shoulder strap 26 is secured to the shafts 14 and serves to support the breast strap 24, which as is shown in Fig. 8, is secured near the ends of the shoulder strap by sewing or in any other suitable manner. When the horse is secured to the vehicle by means of the harness, the band 18 has the sides arranged at the sides of the animal with the curved portion acting as the breeching. The belly-band passes under the horse, while the shoulder strap is arranged over the neck in the usual manner. The breast strap embraces the breast of the animal and acts as a collar.

The breast strap 24 comprises separable sections 27 and 28, joined by means of a catch 42. At the end of the section 27, is fastened a sleeve 29, which extends beyond the strap end and is formed to receive the extremity of the section 28. A spring frame 30 is mounted upon the sleeve and has prongs 31 adapted to extend through openings 32 of the sleeve and to pass through openings 33 of the section 28, formed to register with the openings 32. The frame tends normally to hold the prongs away from the sleeve and out of engagement with the openings 32. A tongue 34 is slidably carried by the frame 30 and has a spring 35 normally projecting the tongue toward the prongs 31. The tongue passes through an opening of a guide member 36 mounted at the inner side of the frame 30 and is formed to engage a stop 37 carried by the sleeve. When the tongue engages the stop, the frame is held in position with the prongs 31 extending through the openings 32; if at the same time the prongs are arranged in the openings 33 of the section 28, the two sections are firmly secured together. At the end remote from the prongs 31 the tongue 34 has a link 38, the end of which is secured to a line 39, consisting of cord or other elongated flexible member. The openings 33 of the section 28 are preferably reinforced by means of eye-rivets 40.

A catch 41 similar to that used for connecting the separable breast strap sections serves to join one end of the belly-band 23 to a part secured to the corresponding shaft 14. The line 39 passes from the catch 42 to the catch 41 so that when the line is pulled the catches are simultaneously released. The line runs along one of the shafts 14, being guided in suitable eyelets 43, to the vehicle, so that it can be operated from the latter by the occupant.

In order to release the reins from the bridle when the horse is set free from the vehicle, I employ catches 44 for the purpose. At the end of each of the reins is located a slidable sleeve 45. A frame 46 is secured rigidly to the end of each rein within the sleeve 45 and projects beyond the same. The rein has a slot 47 which receives a shackle 48 passing through suitable openings of the sleeve and through the slot. By means of the shackle, the sleeve can be moved longitudinally of the rein but is limited in its movement and is prevented from complete disengagement from the rein. The frame 46 carries at the projecting end, a hook 49 engaged by a spring 50 which presses against a shoulder 51 of the hook and tends normally to extend the latter. The end of the rein is provided with a recess 52 in which is arranged a spring 53. The latter engages a stud 54 of the sleeve which projects through an opening 55 of the frame. The spring 53 tends to maintain the frame and the sleeve in a predetermined position such that when the hook 49 is swung toward the end of the rein the extremity of the hook is engaged by a lip 56 of the sleeve and locked in a closed position. The frame is cut away adjacent to the hook so that the bit ring can be held between the hook frame and the hook, as is indicated in dotted outline in Fig. 5. By sliding the sleeve 45 away from the hook, against the tension of the spring 53, the hook is released and is thrown open by the spring 50 so that the rein is at once detached from the bridle. A line 57 is secured at the end of the shackle 48 and has its opposite extremity secured to the rein at a point of the latter between the terret 58 and the vehicle. The terret is mounted in the usual manner upon the shoulder strap 26.

To release the horse from the vehicle, the occupant pulls upon the line 39 and thereby releases the belly-band and the breast strap; this permits the animal to proceed without drawing the vehicle along, and as soon as the horse passes from between the shafts, the latter are moved upwardly by means of the spring 7, so that the brakes are automatically set to bring the vehicle to a stop. When the animal has advanced a certain distance the terrets 58 engage the lines 57 so that a pull is exerted upon the latter to release the catches 44 and thereby to disengage the reins from the bridle.

Having thus described my invention, I claim as new, and desire to secure by Letters Patent:—

1. In a device of the class described, a band constituting traces and breeching and adapted to be secured to the vehicle, a breast strap spaced from said band, resilient means connecting the ends of said breast strap and said band, a belly-band comprising separable sections, said breast strap comprising separable sections, respective means for detachably connecting said separable sections of said belly-band and said breast strap, and means for simultaneously releasing said connecting means of said belly-band and said breast strap, said last-mentioned means being operable from the vehicle.

2. The combination, with shafts, of traces secured to said shafts, a belly-band secured to one of said shafts at one end of said belly-band, a catch for removably securing the other end of said belly-band to the other of said shafts, a breast strap, springs for resiliently connecting said breast strap to said traces, a shoulder strap carried by said shafts and secured to said breast strap, said breast strap comprising separable sections, a detachable catch for connecting said separable sections, and means for simultaneously releasing said catch of said breast strap sections and said catch of said belly-band.

3. In a device of the class described, reins, releasable catches for securing said reins to a bridle, harness adapted to be secured to a vehicle, and means adapted to engage said harness and serving to release said catches when brought into engagement with said harness.

4. In a device of the class described, harness adapted to be secured to a vehicle, a bridle having a bit, reins, catches for detachably securing said reins to said bit of said bridle, and lines connecting said reins and said catches, whereby said catches are released when said lines are brought into engagement with a part of said harness when said lines are drawn from their normal positions.

5. In a device of the class described, a harness including terrets, a bridle, reins passing through said terrets, catches for detachably connecting said reins and said bridle, and lines permanently attached to said reins at points rearwardly of said terrets whereby, when said lines are brought into engagement with said terrets, said catches are released.

6. In a device of the class described, a strap comprising separable sections, one of said sections having a socket member adapted directly to receive an end of the other of said sections, and provided with a member for holding said second section within said socket member, said member tending normally to release said second section, and a catch for maintaining said member operative.

7. In a device of the class described, a breast band comprising separable sections, the first of said sections having a sleeve adapted to receive an end of the other of said sections, a tongue resiliently mounted upon said first section, said sleeve and said second section having openings therethrough adapted to receive said tongue, and means for holding said tongue in position within said opening.

8. In a device of the class described, a breast band comprising separable sections, the first of said sections having a sleeve, a spring frame mounted upon said sleeve, a resiliently held tongue carried by said frame, the first of said sections having a stop adapted to engage said tongue, said frame being formed to engage the second of said sections to hold it rigid with respect to the first of said sections, and means for operating said tongue from a point remote from the same.

In testimony whereof I have signed my name to this specification in the presence of two subscribing witnesses.

DAVID F. BALENTINE.

Witnesses:
C. B. BOBO,
JOHN A. FRANKS.